July 2, 1935.                S. KANTER                2,006,808
                            SMOKING PIPE
                         Filed Jan. 25, 1932
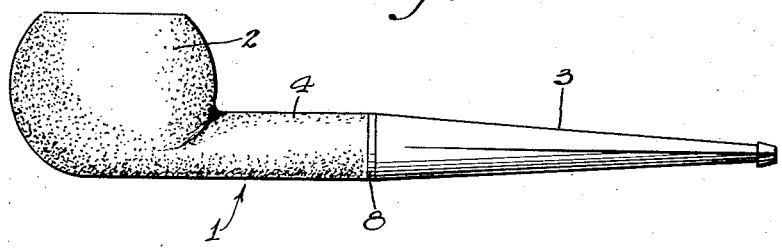
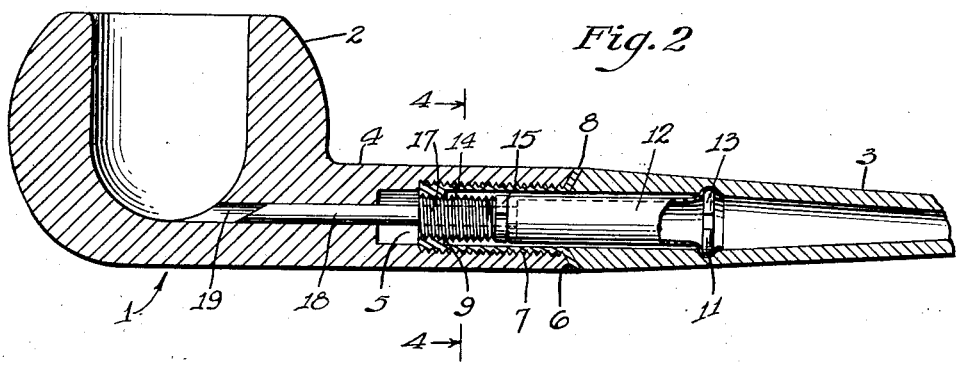
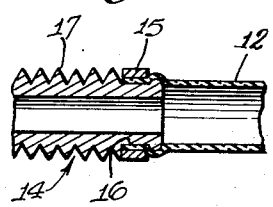 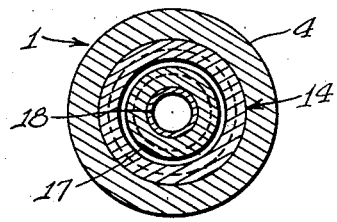
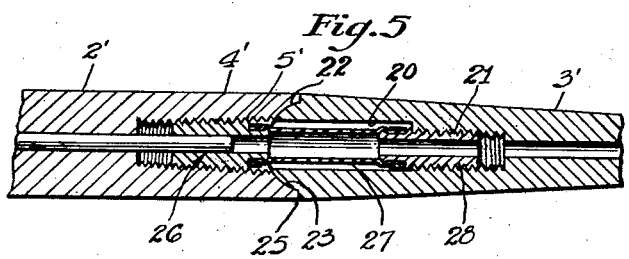
Sam Kanter.
   Inventor:
By: Munn & Co.
         Atty's.

Patented July 2, 1935

2,006,808

UNITED STATES PATENT OFFICE 2,006,808

SMOKING PIPE

Sam Kanter, Chicago, Ill.

Application January 25, 1932, Serial No. 588,700

7 Claims. (Cl. 131—12)

My invention relates to improvements in smoking pipes, and it consists in the combinations, constructions, and arrangements herein described and claimed.

An object of my invention is to provide a smoking pipe having its mouthpiece flexibly connected to the bowl portion of the pipe.

Another object of my invention is to provide means whereby the mouthpiece of the pipe may be flexibly connected in an elastic manner to the bowl portion of the pipe, and the mouthpiece may be held at any desired tension.

A further object is to provide a smoking pipe of the class described having means whereby the mouthpiece is prevented from moving laterally with respect to the stem of the pipe bowl.

Other objects and advantages will appear in the following specification, and the novel features of the invention will be particularly pointed out in the appended claims.

My invention is illustrated in the accompanying drawing, forming part of this application, in which Figure 1 is a side elevational view of a pipe embodying my invention, Figure 2 is an enlarged sectional detail view of the pipe shown in Figure 1, Figure 3 is an enlarged detail view of a portion of the pipe coupling means, Figure 4 is a section taken along the line 4—4 of Figure 2, and Figure 5 is a fragmentary sectional detailed view of a modified form of my invention.

In carrying out my invention, I provide a pipe 1 having a pipe bowl 2 and a mouthpiece 3. The pipe bowl 2 is provided with a stem portion 4 having an interiorly threaded recess 5. The end of the bowl portion connected to the mouthpiece 3 may be tapered as is indicated at 6. Threadedly connected in the recess 5 is an exteriorly threaded tubular means 7 which is provided with a tapered flange portion 8 adapted to fit over the tapered portion 6 substantially as shown in Figure 2. The inner end portion of the tubular means 7 may be provided with an inwardly-extending interiorly-threaded annular shoulder 9.

The inner portion of the mouthpiece 3 may be tapered so as to fit nicely against the flange 8. The pipe stem may be provided in its hollow interior with an annular groove 11, whereby an elastic tube 12, which may be made of rubber, may be clampingly secured by a flexible split ring 13. The tube 12 may be of any desired length and its opposite end is clampingly secured to an exteriorly threaded tube 14 by a clamping ring 15 or any other suitable means. If desired, the tube 14 may be provided with a recessed portion 16 whereby the clamping ring 15 may more securely engage the end of the flexible tube 12. The exterior threads 17 of the tube 14 are adapted for threaded engagement with the threaded shoulder 9. The tube 14 is provided at its inner end with a small tubular member 18 which may extend into the bore 19 of the pipe bowl 2.

From the foregoing description of the various parts of the device, the operation thereof may be readily understood. It will be understood by referring to Figure 2 that the inner end of the flexible tube 12 is rigidly attached to the mouthpiece 3 and that the opposite end of the tube is rigidly secured to the threaded tube 14. Therefore, as the pipe stem is rotated, the threaded member 14 is moved, as the case may be, inwardly or outwardly, by reason of its being threadedly engaged with the shoulder 9.

The tube 12 is sufficiently stiff to cause the fine threads 17 of member 14 to turn within the threads of the sleeve 9 to effect the necessary stretching of the tube for holding the mouthpiece 3 in normal position during use, but permitting it to move in all angular directions with respect to the stem 4 when subjected to such stresses as frequently break the threaded nipples of mouthpieces of ordinary construction.

It is readily apparent that the elastic tube 12 will be stretched as the threaded tubular means 14 is advanced toward the central portion of the pipe bowl, and that the tension at which the mouthpiece 3 is held against the pipe bowl 2 will be increased accordingly. When the mouthpiece is screwed in the opposite direction, the tension of course will be decreased. The tapered manner in which the bowl 2 and the mouthpiece 3 are fitted together prevents the mouthpiece from moving laterally with respect to the bowl during use when they are joined together at a suitable tension.

The pipe shown in Figure 2 may be assembled also by first screwing the sleeve 7 when detached from the stem, on the member 14, to provide the necessary tension on the tube 12, and then screwing the sleeve 7 into the stem 4, the flange 8 forming a finger hold for the latter operation.

In Figure 5 I have shown a modified form of my invention in which I make use of a pipe bowl 2' and a mouthpiece 3'. The end portion 4' of the bowl 2' is provided with an interiorly inwardly tapered threaded recess 5'. The mouthpiece 3' is provided with a cylindrical recess 20 and a reduced threaded recess 21. The stem portion 4' and the mouthpiece 3' are provided respectively with a concave portion 22 and a convex portion 23 which are adapted to be fitted together substantially as shown.

Near the circumferential edge the stem portion 4' and the mouthpiece 3' are provided with shoulders, as is indicated at 25, whereby the two portions when they are clamped together may be held in their proper relation to each other and may be prevented from flexing unless force is used to move the stem portion 4' and the pipe bowl 2' out of alignment with the mouthpiece 3'. The interior of the pipe is provided with a tapered tubular threaded portion 26 adapted for engagement with the tapered threaded recess portion 5'. Fixedly secured to the tapered tubular member 26 is an elastic tube 27 which is also connected to a threaded metal or wooden tube 28, substantially as shown in Figure 5. The tube 28 is threadedly secured in the threaded recess 21. By rotating the mouthpiece, the mouthpiece may be coupled to the bowl 2' at any desired tension, the flexible tube 27 being sufficiently stiff to cause the threads of the member 28 to turn within the threaded recess 21.

I claim:

1. A smoking pipe of the character described comprising a pipe bowl, a mouthpiece for the bowl, and a connector means disposed within the bowl and the mouthpiece, whereby the bowl and the mouthpiece may be held together in a resilient manner, the bowl and the mouthpiece being each provided with recessed portions, the connector means being disposed in the recessed portions and including an elastic tube having rigid means at either end of the tube whereby the tube may be secured to the bowl and the mouthpiece.

2. A smoking pipe of the character described comprising a pipe bowl, a mouthpiece for the bowl, and a connector means disposed within the bowl and the mouthpiece, whereby the bowl and the mouthpiece may be held together in a resilient manner, the bowl and the mouthpiece being each provided with recessed portions, the connector means being disposed in the recessed portions and including an elastic tube having rigid means at either end of the tube whereby the tube may be threadedly secured to the bowl and the mouthpiece.

3. A smoking pipe of the class described including a bowl portion, a mouthpiece portion, and an elastic connector means, said connector means being positioned within the bowl and the pipe near the junction thereof, one end of said connector means being threadedly secured to the pipe bowl, the other end of said connector means being rigidly secured to the mouthpiece.

4. A smoking pipe of the character described comprising a pipe bowl and a mouthpiece, said pipe bowl and said mouthpiece being provided with recessed portions and being connected by a rubber tube provided at either end with rigid connecting means, one of said connecting means being threadedly secured to the pipe bowl and the other of said connecting means being held within the recessed portion of the mouthpiece in a spring-pressed manner.

5. A smoking pipe of the character described comprising a pipe bowl, a mouthpiece, and an elastic tubular connector means for connecting the pipe bowl to the mouthpiece in a resilient manner, said pipe bowl being provided with a tapered threaded recessed portion, said mouthpiece being provided with a cylindrical threaded recessed portion, one end of said connector means being provided with a tapered threaded tubular means adapted to threadedly engage the tapered threaded recessed portion, the other end of said tubular connector means being provided with an exteriorly threaded rigid tubular means, whereby the connector means may be threadedly connected to the cylindrical threaded recessed portion of the mouthpiece.

6. A smoking device comprising a bowl, a mouthpiece arranged in abutting end to end relation with said bowl, flexible connecting means for said bowl and mouth piece arranged to permit movement of either with respect to the other in all angular directions when subjected to abnormal stresses transversely thereof, said connecting means comprising a flexible member, and means securing said member to said bowl and mouthpiece under sufficient tension to retain the same in aligned end to end relation and to support said bowl in normal position with respect to the mouthpiece during use.

7. A smoking device comprising a stem and mouthpiece arranged in abutting end to end relation and a connector within said stem and mouthpiece comprising a stretchable tube secured at the ends thereof to said stem and mouth piece and under sufficient tension to retain said stem in normal position during use, but permitting relative angular movement of said stem and mouthpiece.

SAM KANTER.